(12) United States Patent
Skukkestad et al.

(10) Patent No.: US 12,504,807 B1
(45) Date of Patent: *Dec. 23, 2025

(54) POWER REGULATION IN AN ACTIVE DISPLAY SYSTEM

(71) Applicant: REMARKABLE AS, Oslo (NO)

(72) Inventors: Lars Ivar Miljeteig Skukkestad, Oslo (NO); Steinar Bakkemo, Oslo (NO); Patrick Hisni Brataas, Oslo (NO)

(73) Assignee: REMARKABLE AS, Oslo (NO)

( * ) Notice: Subject to any disclaimer, the term of this patent is extended or adjusted under 35 U.S.C. 154(b) by 0 days.

This patent is subject to a terminal disclaimer.

(21) Appl. No.: 18/890,551

(22) Filed: Sep. 19, 2024

Related U.S. Application Data

(63) Continuation of application No. 17/316,526, filed on May 10, 2021, now Pat. No. 12,124,317.

(60) Provisional application No. 63/022,188, filed on May 8, 2020.

(51) Int. Cl.
| | |
|---|---|
| *G06F 1/3234* | (2019.01) |
| *G06F 1/3231* | (2019.01) |
| *G06F 3/01* | (2006.01) |
| *G06F 3/041* | (2006.01) |

(52) U.S. Cl.
CPC .......... *G06F 1/3262* (2013.01); *G06F 1/3231* (2013.01); *G06F 3/017* (2013.01); *G06F 3/041* (2013.01)

(58) Field of Classification Search
None
See application file for complete search history.

(56) References Cited

U.S. PATENT DOCUMENTS

| | | | | |
|---|---|---|---|---|
| 5,983,273 | A  * | 11/1999 | White | H04L 63/0853 |
| | | | | 713/1 |
| 2005/0071702 | A1 * | 3/2005 | Morisawa | G06F 1/3203 |
| | | | | 713/320 |
| 2013/0083074 | A1 * | 4/2013 | Nurmi | G06F 3/0488 |
| | | | | 345/650 |

(Continued)

OTHER PUBLICATIONS

United States Patent Office, Office Action, U.S. Appl. No. 17/316,526, filed Apr. 22, 2022, 17 pages.

(Continued)

*Primary Examiner* — Parul H Gupta
(74) *Attorney, Agent, or Firm* — Fenwick & West LLP

(57) ABSTRACT

One embodiment of a disclosed system, method, and computer readable storage medium which includes an algorithm for regulating power to electronic components of a device. In an active state, the system detects a period of inactivity based on a frequency of gesture inputs to the contact-sensitive surface of the device. In response to detecting the period of inactivity, the device transitions into an idle state with reduced power consumption by electronic components of the device. The device records an amount of time that the device has spent in the idle state transitions into a regularized suspend state where power consumption by electronic components of the device is reduced from the consumption in the idle state to detect one or more activation trigger conditions. In the regularized suspended state, the device presents a persistent display comprising a graphic generated in response to a most recent set of user inputs the device.

15 Claims, 5 Drawing Sheets

(56) References Cited

U.S. PATENT DOCUMENTS

| | | | |
|---|---|---|---|
| 2015/0022439 A1* | 1/2015 | Alameh | G06F 3/017 |
| | | | 345/156 |
| 2015/0036573 A1* | 2/2015 | Malik | G08C 17/02 |
| | | | 370/311 |
| 2017/0156115 A1* | 6/2017 | Yang | H04W 52/0254 |

OTHER PUBLICATIONS

United States Patent Office, Office Action, U.S. Appl. No. 17/316,526, filed Sep. 2, 2022, 18 pages.
United States Patent Office, Office Action, U.S. Appl. No. 17/316,526, filed Jan. 13, 2023, 38 pages.
United States Patent Office, Office Action, U.S. Appl. No. 17/316,526, filed Jul. 31, 2023, 22 pages.
United States Patent Office, Office Action, U.S. Appl. No. 17/316,526, filed Nov. 29, 2023, 23 pages.

* cited by examiner

POWER REGULATION IN AN ACTIVE DISPLAY SYSTEM

CROSS REFERENCE TO RELATED APPLICATIONS

This application is a continuation of U.S. application Ser. No. 17/316,526, filed May 10, 2021, which claims the benefit of U.S. Provisional Patent Application No. 63/022,188, filed on May 8, 2020, which are all incorporated herein in their entirety for all purposes.

TECHNICAL FIELD

The disclosure relates generally to methods and systems for regulating power consumption in a display system, and more specifically, to regulating power consumption by individual components of the display system.

BACKGROUND

Devices with an active display system consume a significant amount of power by keeping the display system in an active state for extended periods of time. Often times, electrical components of the device remain in an activated, power consuming state even when a user is not currently using the device. For example, a user begins writing on the display of a device, before getting up suddenly to perform a different task. In such instances, power can be conserved by recognizing that while the user is away, every component of the display system or the device need not remain in an active state. Conventional devices fail recognize these periods of inactivity and even if they, they either do so with such latency that the delay consumes significant amounts of power anyway or they are unable to regulate power consumption to optimize the performance of the device.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG.

Figure 1:
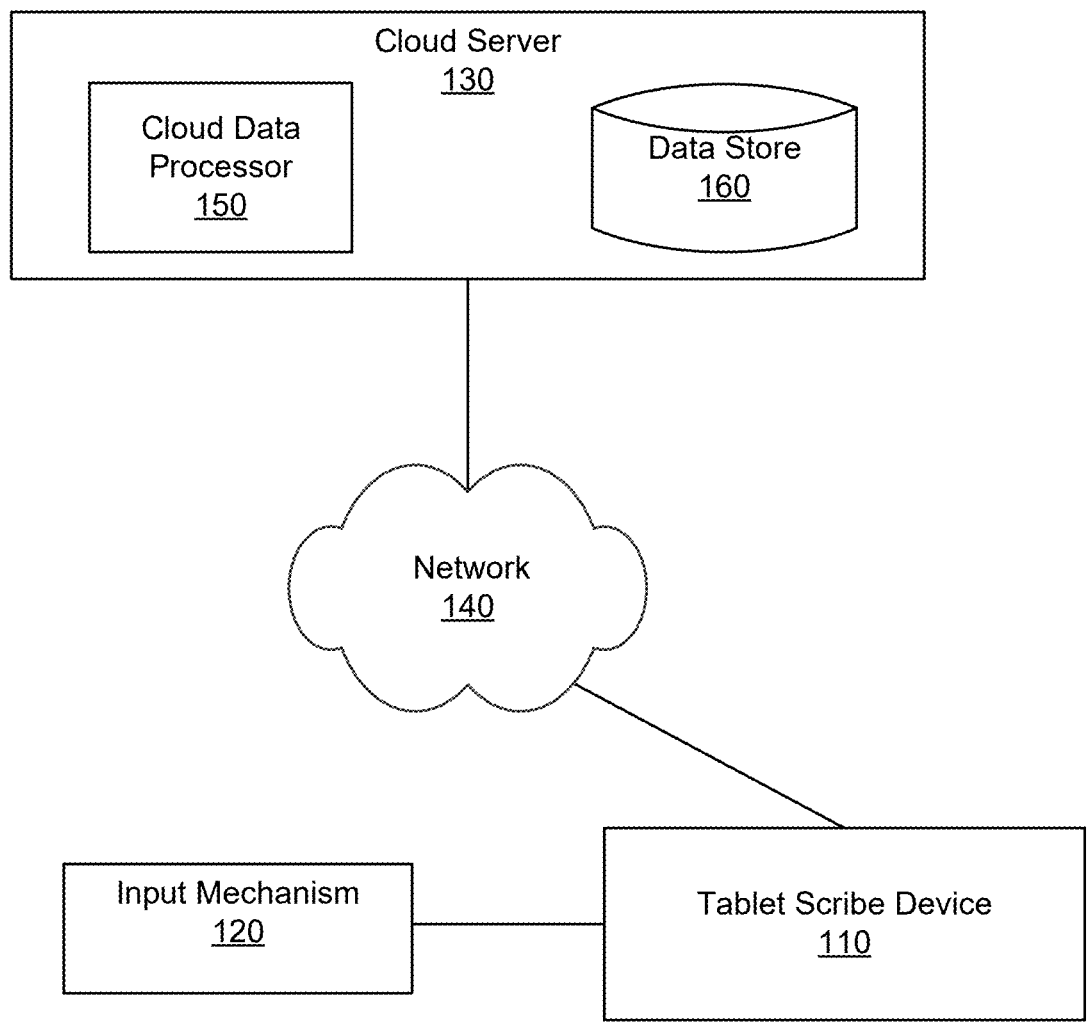
(FIG. 1 illustrates a system architecture for a scribe device for transcribing content on a screen based on user input, according to one example embodiment.

The figures depict various embodiments of the presented invention for purposes of illustration only. One skilled in the art will readily recognize from the following discussion that alternative embodiments of the structures and methods illustrated herein may be employed without departing from the principles described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

I. Overview

Disclosed is a configuration (including a system, a process, as well as non-transitory computer readable storage medium storing program code) for regulating power consumption of a device with a display system. The device comprises a plurality of electronic components which perform various processing functions that enable the device to receive inputs, process those inputs, and present outputs to a user. The described techniques outline protocols for regulating power consumption to individual components of the device based on a current level of activity of both the device and a user of the device.

By way of example, a configuration (system, method and/or non-transitory computer readable storage medium) regulates power to electronic components of a computing device, e.g., a tablet device. The configuration detects a period of inactivity for the computing device based on a frequency of gesture inputs to a contact-sensitive surface of the table device. The computing device transitions into an idle state in response to detecting the period of inactivity. A power consumption by electronic components in the idle state is reduced to detect user inputs at the contact-sensitive surface. The configuration records an amount of time that the device has spent in the idle state and transitions the one or more electronic components of the computing device into a regularized suspend state in response to the amount of time in the idle state exceeding a threshold. The power consumption by electronic components in the regularized suspended state is reduced from the consumption in the idle state to detect one or more activation trigger conditions. The configuration presents, by a display system of the computing device, a persistent display while the computing device is in the regularized suspended state. The persistent display may include a graphic generated in response to a most recent set of user inputs the device.

II. System Configuration

Turning now to Figure (FIG. 1, it illustrates a system architecture for a scribe device that enables (or provides) for display on a screen (or display) rendered free form input from a user (e.g., handwriting, gesture or the like), according to one example embodiment. In the example embodiment illustrated in FIG. 1, the system environment may comprise a tablet scribe device 110, an input mechanism 120, a cloud server 130, and a network 140.

The tablet scribe device 110 may be a computing device configured to receive contact input (e.g., detect handwriting, gestures (generally, gestures)) and process the gestures into instructions for updating the user interface to provide, for display, a response corresponding to the gesture (e.g., show the resulting gesture) on the device 110. Examples of the tablet scribe device 110 may include a computing tablet with a touch sensitive screen (hereafter referred to as a contact-sensitive screen). It is noted that the principles described herein may be applied to other devices coupled with a contact-sensitive screen, for example, desktop computers, laptop computers, portable computers, personal digital assistants, smartphones, or any other device including computer functionality.

The tablet scribe device 110 receives gesture inputs from the input mechanism 120, for example, when the input mechanism 120 makes physical contact with a contact-sensitive surface (e.g., the touch-sensitive screen) on the tablet scribe device 110. Based on the contact, the tablet scribe device 110 generates and executes instructions for updating content displayed on the contact-sensitive screen to reflect the gesture inputs. For example, in response to a gesture transcribing a verbal message (e.g., a written text or a drawing), the tablet scribe device 110 updates the contact-sensitive screen to display the transcribed message. As another example, in response to a gesture selecting a navigation option, the tablet scribe device 110 updates the screen to display a new page associated with the navigation option.

The input mechanism 120 refers to any device or object that is compatible with the contact-sensitive screen of the tablet scribe device 110. In one embodiment, the input mechanism 120 may work with an electronic ink (e.g., E-ink) contact-sensitive screen. For example, the input mechanism 120 may refer to any device or object that can interface with a screen and, from which, the screen can detect a touch or contact of said input mechanism 120. Once the touch or contact is detected, electronics associated with the screen generate a signal which the tablet scribe device 110 can process as a gesture that may be provided for display on the screen. Upon detecting a gesture by the input mechanism 120, electronics within the contact-sensitive screen generate a signal that encodes instructions for displaying content or updating content previously displayed on the screen of the tablet scribe device 110 based on the movement of the detected gesture across the screen. For example, when processed by the tablet scribe device 110, the encoded signal may cause a representation of the detected gesture to be displayed on the screen of the tablet scribe device 110, for example a scribble.

In some embodiments, the input mechanism 120 is a stylus or another type of pointing device. Alternatively, the input mechanism 120 may be a part of a user's body, for example a finger and/or thumb.

In one embodiment, the input mechanism 120 is an encased magnetic coil. When in proximity to the screen of the tablet scribe device 110, the magnetic coil helps generate a magnetic field that encodes a signal that communicates instructions, which are processed by the tablet scribe device 110 to provide a representation of the gesture for display on the screen, e.g., as a marking. The input mechanism 120 may be pressure-sensitive such that contact with the contact-sensitive display causes the magnetic coil to compress. In turn, the interaction between the compressed coil and the contact-sensitive screen of the tablet scribe device 110, may generate a different encoded signal for processing, for example, to provide for display a representation of the gesture on the screen that has different characteristics, e.g., thicker line marking. In alternate embodiments, the input mechanism 120 include a power source, e.g., a battery, that can generate a magnetic field with a contact-sensitive surface. It is noted that the encoded signal is a signal that is generated and may be communicated. The encoded signal may have a signal pattern that may be used for further analog or digital analysis (or interpretation).

In one embodiment, the contact-sensitive screen is a capacitive touchscreen. The screen may be designed using a glass material coated with a conductive material. Electrodes, or an alternate current carrying electric component, are arranged vertically along the glass coating of the screen to maintain a constant level of current running throughout the screen. A second set of electrodes are arranged horizontally. The matrix of vertical active electrodes and horizontal inactive electrodes generates an electrostatic field at each point on the screen. When an input mechanism 120 with conductive properties, for example the encased magnetic coil or a human finger, is brought into contact with an area of the screen of the tablet scribe device 110, current flows through the horizontally arranged electrodes, disrupting the electrostatic field at the contacted point on the screen. The disruption in the electrostatic field at each point that a gesture covers may be measured, for example as a change in capacitance, and encoded into an analog or digital signal.

In an alternate embodiment, the contact-sensitive screen is a resistive touchscreen. The resistive touch screen comprises two metallic layers: a first metallic layer in which striped electrodes are positioned on a substrate, for example a glass or plastic and a second metallic layer in which transparent electrodes are positioned. When contact from an input mechanism, for example a finger, stylus, or palm, is made on the surface of the touchscreen, the two layers are pressed together. Upon contact, a voltage gradient is applied to the first layer and measured as a distance by the second layer to determine a horizontal coordinate of the contact on the screen. The voltage gradient is subsequently applied to the second layer to determine a vertical coordinate of the contact on the screen. The combination of the horizontal coordinate and the vertical coordinate register an exact location of the contact on the contact-sensitive screen. Unlike capacitive touchscreens which rely on conductive input mechanisms, a resistive touchscreen senses contact from nearly any input mechanism. Although some embodiments of the scribe device are described herein with reference to a capacitive touchscreen, one skilled in the art would recognize that a resistive touchscreen could also be implemented.

In an alternate embodiment, the contact-sensitive screen is an inductive touchscreen. An inductive touchscreen comprises a metal front layer that detects deflections when contact is made on the screen by an input mechanism. Accordingly, an inductive touchscreen senses contact from nearly any input mechanism. Although some embodiments of the scribe device are described herein with reference to a capacitive touchscreen, one skilled in the art would recognize that alternative touchscreen technology may be implemented, for example, an inductive touchscreen could also be implemented.

The cloud server 130 is receives information from the tablet scribe device and/or communicate instructions to the tablet scribe device 110. As illustrated in FIG. 1, the cloud server 130 may comprise a cloud data processor 150 and a data store 160. Data recorded and stored by the tablet scribe device 110 may be communicated to the cloud server 130 for storage in the data store 160. For example, the data store 160 may store documents, images, or other types of content generated or recorded by a user through the tablet scribe device 110. In some embodiments, the cloud data processor 150 monitors the activity and usage of the tablet scribe device 110 and communicates processing instructions to the tablet scribe device 110. For example, the cloud data processor 150 may regulate synchronization protocols for data stored in the data store 160 with the tablet scribe device 110.

Interactions between the tablet scribe device 110 and the cloud server 130 are typically performed via the network 140, which enables communication between the tablet scribe device 110 and the cloud server 130. In one embodiment, the network 140 uses standard communication technologies and/or protocols including, but not limited to, links using technologies such as Ethernet, 802.11, worldwide interoperability for microwave access (WiMAX), 3G, 4G, LTE, digital subscriber line (DSL), asynchronous transfer mode (ATM), InfiniBand, and PCI Express Advanced Switching. The network 140 may also utilize dedicated, custom, or private communication links. The network 140 may comprise any combination of local area and/or wide area networks, using both wired and wireless communication systems.

Figure 2:
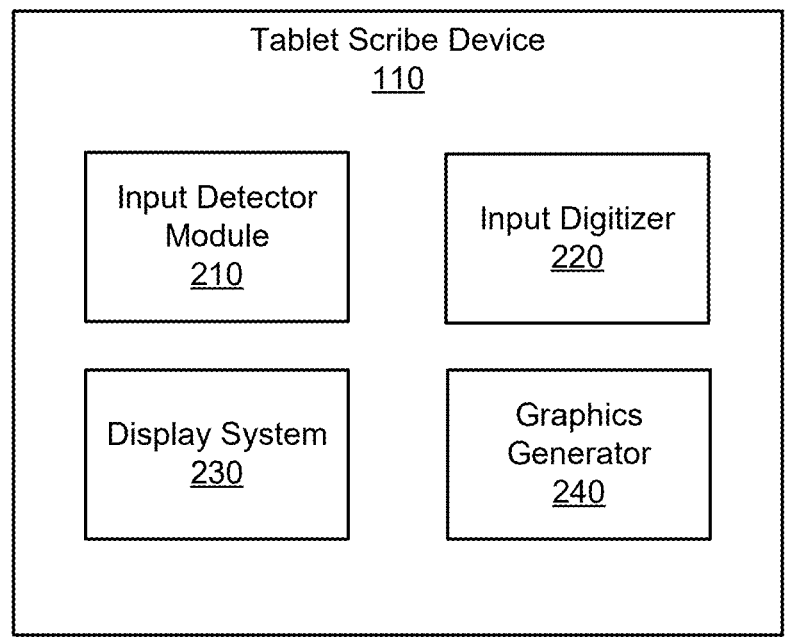
FIG. 2 is a block diagram of the system architecture of a tablet scribe device, according to one example embodiment.

FIG. 2 is a block diagram of the system architecture of a tablet scribe device, according to one example embodiment. In the embodiment illustrated in FIG. 2, the tablet scribe device 110 comprises an input detector module 210, an input digitizer 220, a display system 230, and a graphics generator 240.

The input detector module 210 may recognize that a gesture has been or is being made on the screen of the tablet scribe device 110. The input detector module 210 refers to electronics integrated into the screen of the tablet scribe device 110 that interpret an encoded signal generated by contact between the input mechanism 120 and the screen into a recognizable gesture. To do so, the input detector module 210 may evaluate properties of the encoded signal to determine whether the signal represents a gesture made intentionally by a user or a gesture made unintentionally by a user.

The input digitizer 220 converts the analog signal encoded by the contact between the input mechanism 120 and the screen into a digital set of instructions. The converted digital set of instructions may be processed by the tablet scribe device 110 to generate or update a user interface displayed on the screen to reflect an intentional gesture.

The display system 230 may include the physical and firmware (or software) components to provide for display (e.g., render) on a screen a user interface. The user interface may correspond to any type of visual representation that may be presented to or viewed by a user of the tablet scribe device 110.

Based on the digital signal generated by the input digitizer 230, the graphics generator 240 generates or updates graphics of a user interface to be displayed on the screen of the tablet scribe device. The display system 240 presents those graphics of the user interface for display to a user using electronics integrated into the screen.

When an input mechanism 120 makes contact with a contact-sensitive screen of a tablet scribe device 110, the input detector module 210 recognizes a gesture has been made through the screen. The gesture may be recognized as a part of an encoded signal generated by the compression of the coil in the input mechanism 120 and/or corresponding electronics of the screen of the display system 230 when the input mechanism makes contact with the contact-sensitive screen. The encoded signal is transmitted to the input detector module 210, which evaluates properties of the encoded signal in view of at least one gesture rule to determine whether the gesture was made intentionally by a user. The input detector module 210 is further described with reference to FIG. 3.

If the input detector module 210 determines that the gesture was made intentionally, the input detector module 210 communicates the encoded signal to the digitizer output 220. The encoded signal is an analog representation of the gesture received by a matrix of sensors embedded in the display of the device 120.

In one example embodiment, the input digitizer 220 translates the physical points on the screen that the input mechanism 120 made contact with into a set of instructions for updating the what is provided for display on the screen. For example, if the input detector module 210 detects an intentional gesture that swipes from a first page to a second page, the input digitizer 220 receives the analog signal generated by the input mechanism 120 as it performs the swiping gesture. The input digitizer 220 generates a digital signal for the swiping gesture that provides instructions for the display system 230 of the tablet scribe device 110 to update the user interface of the screen to transition from, for example, a current (or first page) to a next (or second page, which may be before or after the first page).

In one example embodiment, the graphics generator 240 receives the digital instructional signal (e.g., swipe gesture indicating page transition (e.g., flipping or turning) generated by the input digitizer 220. The graphics generator 240 generates graphics or an update to the previously displayed user interface graphics based on the received signal. The generated or updated graphics of the user interface are provided for display on the screen of the tablet scribe device 110 by the display system 230, e.g., displaying a transition from a current page to a next page to a user.

The generated or updated graphics are presented by the display system 230 through the contact-sensitive screen of the tablet scribe device 110. Depending on the availability of content generated by the graphics generator 230 (if any) or a current level and frequency of interaction detected by the input detector module 210 (if any), the display system 230 and potentially other components of the tablet scribe device 110 may fluctuate between states with varying power consumptions, for example a high consumption active state, a moderate consumption idle state, and a low consumption suspended state. In each state, a different combination of the electronic components of the tablet scribe device 110 continue to consume power at different levels of consumption. For example, in the active state, all components may consume power at full capacity, in an idle state only components required to display static content may continue to consume power continue to consume power, and in a suspended state only components required to transition the device back to an active state continue to consume power. The display system 230 is further described with reference to FIGS. 3 and 4.

III. Regularized Suspended State of Display System

Figure 3:
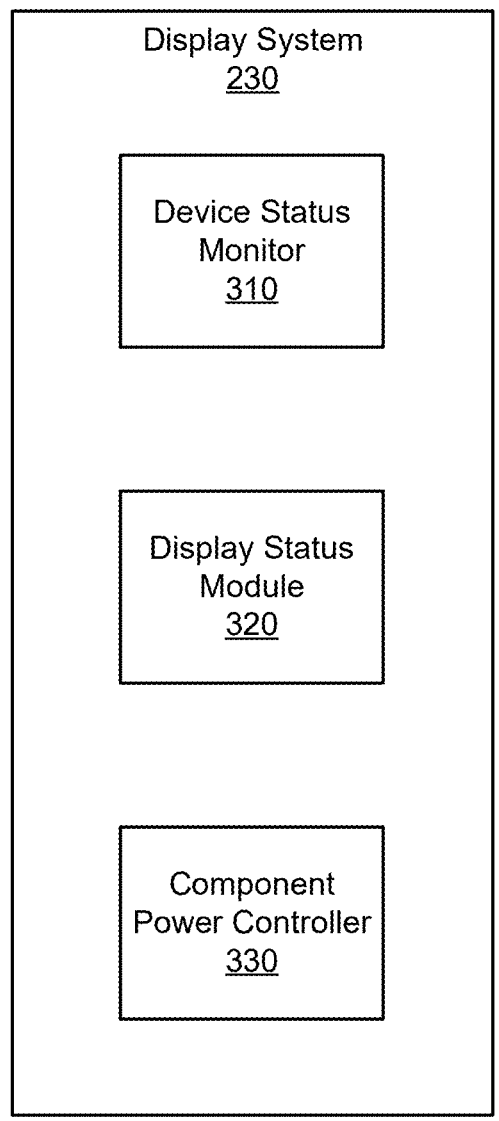
FIG. 3 is a block diagram of the system architecture of a display system, according to one example embodiment.

FIG. 3 is a block diagram of the system architecture of a display system 230, according to one example embodiment. The display system 230 may include a device status monitor 310, a display status module 320, and a component power controller 330. As described above, the display system 230 presents graphic content to a user via a screen of the tablet scribe device 110.

The device status monitor 310 monitors the tablet scribe device 110 in various states defined by the level of user interaction with the device. For example, in a first state powered-on state, the contact-sensitive screen of the device 110 is actively detecting frequent gesture inputs from a user. In a second powered-on state, the contact-sensitive screen of the device 110 is detecting infrequent gesture inputs. In a third powered-off state, the device may be deactivated to not detect any gesture inputs. The device status monitor may also monitor other intermediate states.

The display status module 320 communicates with the input detection module 210 to detect periods of inactivity. In some implementations, periods of inactivity may be characterized by a reduced frequency of gesture inputs detected by the contact sensitive screen or other interactions with the device. In embodiments where the contact-sensitive screen is detecting gesture inputs at a higher frequency, for example a user drawing or writing notes on the display, the display status module 320 communicates instructions to the component power controller 330 that cause the controller 330 to keep electrical components of the device active (i.e., maintain the power consumption of the electrical components) to enable the full functionalities of the tablet scribe device 110.

In response to instructions received from the display status module 320, the component power controller 330 may maintain power consumption by some electrical components of the device to enable particular functionalities of the tablet scribe device, 110 while reducing power consumption of other electrical components of the device 110. As described herein, active components are those that are currently consuming power and inactive components are those that are not. As described herein, electrical components of the device 110 include, but are not limited to, the device memory, the computer processing unit (CPU), the data chip, the EMMC slid state memory, the W-Fi connectivity component, and the touch-sensing capabilities of the display.

Referring back to the device status monitor 310, the monitor 310 generally determines whether the tablet scribe device 110 is in a powered-on state or a powered-off state. More specifically, the device status monitor 310 may, by way of example, monitor the tablet scribe device 110 in one of three states: 1) powered on and receiving frequent gesture inputs from a user 2) powered on but in an idle, power conserving state, or 3) powered off. In the second state (e.g., powered on but in an idle state), which will be discussed in further detail below, the device status monitor 310 maintains power to components capable of transitioning the device back to the first state in response to one of several triggering conditions. Examples of triggering conditions include, but are not limited to, detecting a gesture input to the contact-sensitive display, connecting the device to a charging port, or contacting a power button on the device. In the third state (e.g., powered off), the device status monitor 310 may only maintain power to components capable of transitioning the device back to one of the first two "powered on" states in response to a contact to the power button.

After confirming that the device 110 is in either the first or second state (e.g., the device is powered on), the device status module 320 detects a period of inactivity by communicating with the input detection module 210. In embodiments where gesture inputs are detected at a high frequency, for example a user drawing or writing notes on the contact-sensitive screen of the device 130, the display status module 320 generates instructions that cause the component power controller 330 to maintain power to (or alternatively maintain power consumption by) electrical components of the device to enable full functionalities of the tablet scribe device.

In embodiments where gesture inputs or other interactions with the device are detected at decreased frequencies, the device status monitor 310 transitions the device into an idle state. The duration of the period of inactivity may be continuously recorded and compared to a threshold amount of time. If the period of inactivity is longer than the threshold amount of time, the device status monitor 310 may instruct the display system 230 to enter an idle state.

Alternatively, the device status monitor 310 continuously computes the frequency of gesture inputs and compares the computed frequency to a threshold frequency value. If the computed frequency of gesture inputs falls below the threshold, the device status monitor 310 may instruct the display system 230 to enter the idle state. If the frequency of gesture inputs remains above the threshold, the device status monitor 310 maintains the display system 230 in one of the active states discussed above. In the idle state, the component power controller 330 may deactivate a first set of accessory electronic components, while maintaining power to a second set of components that enable the contact-sensing capabilities of the device 130, the activation of the display system 130, and the ability of the device 130 to detect the activation trigger conditions described above. When the device is in the idle state, the display status module 320 continues to actively present content to a user that does not require inputs from the user to the contact-sensitive surface, for example video content or an automatically scrolling set of pages. Additionally, when in the idle state, the input digitizer 220 remains active so that, if any inputs are detected at the contact-sensitive surface are recognized, the graphic generator 240 generates an updated display.

In the idle state, the device status monitor 310 records the amount of time that the device has spent in the idle state. If the device is idle for longer than a threshold amount of time, the device status monitor 310 generates instructions for the the component power controller 330 to transition each component of the tablet scribe device into a regularized suspended state. In the regularized suspended state, the component power controller 330 communicates a command to each component of the electronic components of the tablet scribe device to transition into a suspended state, for example a low power mode or an idle state. In their respective suspended states, each electrical component consumes less power. For example, in the regularized suspend state, the contact-sensitive surface of the tablet scribe device 130 and the input mechanism detect for a user input to transition the display system back into a powered-on state, whereas in the active state both components additionally read the location of the input mechanism on the screen. Accordingly, both the device 130 and the input mechanism consume less power in the regularized suspend state. Described more generally, the device status monitor 310 generates instructions for the component power controller 330 to transition specific electronic components of the tablet scribe device 130 into a regularized suspended state when the device status monitor 310 determines that the user is no longer interacting with the device or that the user's interactions with the device do not require additional processing by electrical components of the display system 230 or the graphics generator 240.

In one embodiment, when entering the regularized suspend mode, the component power controller 330 deactivates the CPU, places the memory in an inactive retention mode, and places the CPU, EMMC solid state memory, and Wi-Fi chip into a power conserving "sleep" mode. Additionally, in the regularized suspend mode, the component power controller 330 maintains power to components associated with the contact-sensing capabilities of the device 130 and the operating the display in an active state. When the device status monitor 310 detects at least one activation trigger condition (e.g., a gesture input or digitizer input), the display status monitor 320 redirects power to the CPU and all other deactivated components to enable the full functionality of the tablet scribe device 110.

Additionally, in a conventional, completely inactive "sleep" mode, a display system presents a blank screen or a generic sleep-display screen. In comparison, in the regularized suspended state, the display status module 320 maintains a persistent display while adjusting power distribution to deactivate the components or functionalities described above. In one embodiment of the regularized suspend mode, the display status module 320 presents the most recent display generated by the graphics generator 240 on the screen of the device. Additionally, the combination of components to which power is maintained while the device is in the regularized suspend state enables a user to continue operating the device as if the device was in the first powered-on state. Additionally, because of hardware design constraints, the transition from a regularized suspended state to an active state may involve a time delay, for example, 200 to 500 milliseconds (ms). Accordingly, in response to a user's interaction with the device while in the regularized suspend mode, the presentation of the persistent display allows the device to transition to the active state without affecting the user's experience or ability to view content through the display.

Figure 4:
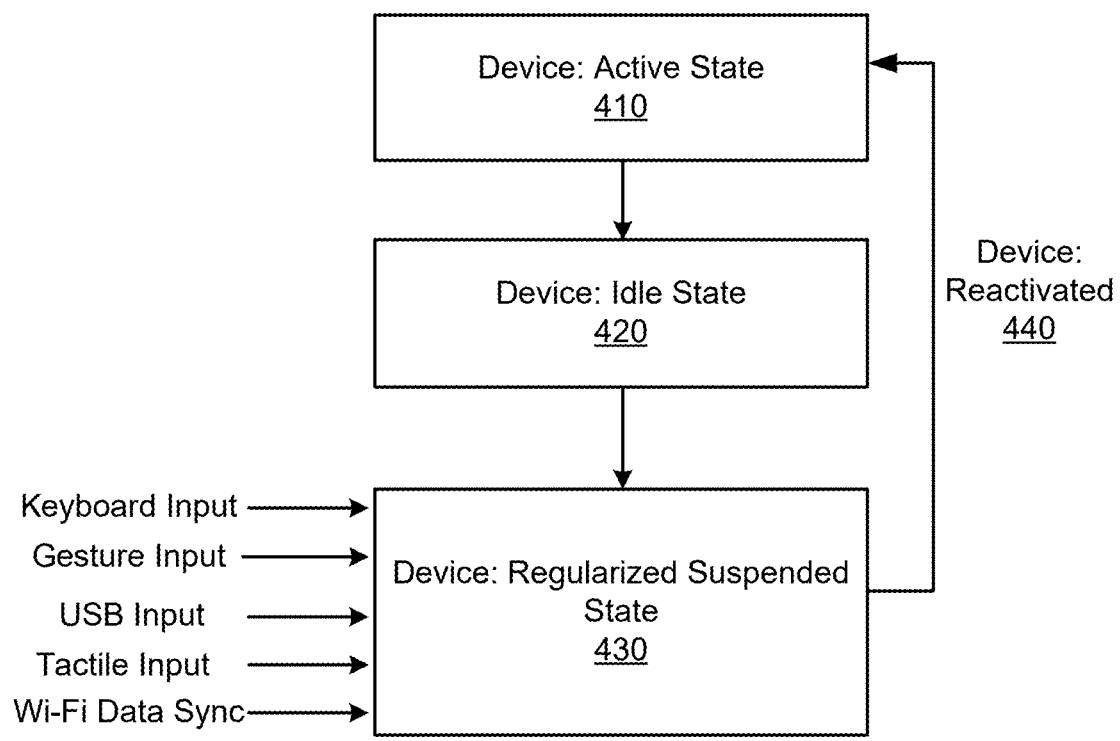
FIG. 4 is a flowchart of a process for regulating power consumption of a scribe device, according to one example embodiment.

FIG. 4 is a flowchart of a process for regulating power consumption of a scribe device, according to one example embodiment. Initially, a user interacts with a device in an active state 410. As the frequency of interactions from the user decreases, the display system 230 deactivates a first set of electrical components to enter an idle state 420. The deactivation of these electrical components reduces the overall power consumption of the tablet scribe device 110 and prolongs the battery life of the device. After being in the idle state 420 for a threshold amount of time, the display system 230 enters a regularized suspended state by further deactivating a second set of electrical components or reducing power consumption by the components in the second set. In the regularized suspended state, the device 130 presents a persistent display to a user, while maintaining reduced power consumption by components response for back-end processing of the display system.

The device remains in the regularized suspended state 430 until an activation trigger condition is detected. In response to detecting an activation trigger condition, the device is reactivated 440 and transitions back to the activate state 410. Examples of activation trigger conditions include, but are not limited to, a keyboard input, a gesture input (e.g., input from the input mechanism 120), an input to a universal serial bus (USB) port, a tactile input by the user's finger or other body part, and a data synchronization protocol via a Wi-Fi connection.

IV. Computing Machine Architecture

Figure 5:
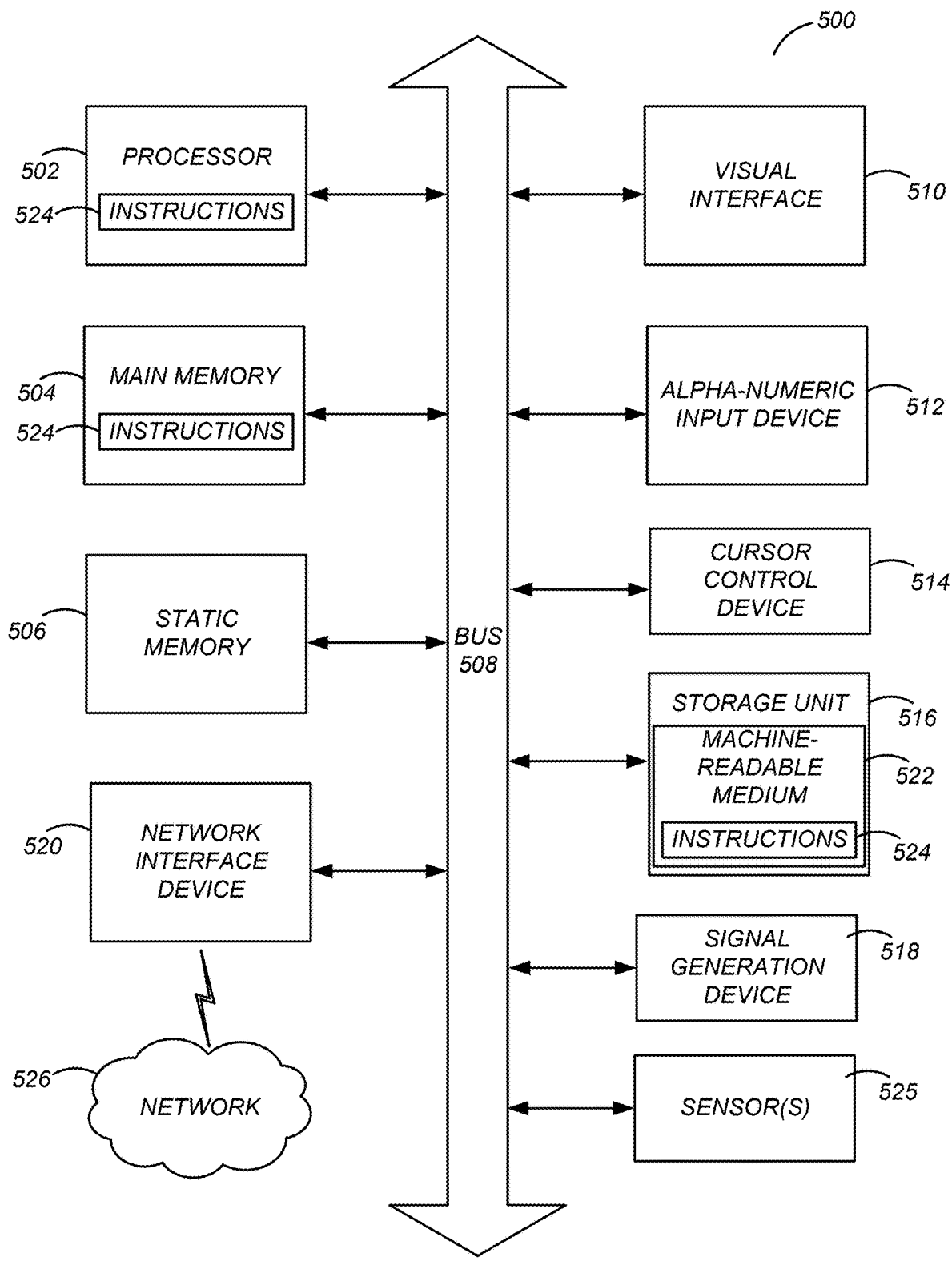
FIG. 5 is a block diagram illustrating components of an example machine able to read instructions from a machine-readable medium and execute them in a processor (or controller), according to one example embodiment.

FIG. 5 is a block diagram illustrating components of an example machine able to read instructions from a machine-readable medium and execute them in a processor (or controller), according to one embodiment. Specifically, FIG. 5 shows a diagrammatic representation of a machine in the example form of a computer system 500 within which program code (e.g., software) for causing the machine to perform any one or more of the methodologies discussed herein may be executed. The tablet scribe device 110 may include some or all of the components of the computer system 500. The program code may be comprised of instructions 524 executable by one or more processors 502. In the tablet scribe device 110, the instructions may correspond to the functional components described in FIGS. 2 and 3 and the processing steps described with FIGS. 3-4.

While the embodiments described herein are in the context of the tablet scribe device 110, it is noted that the principles may apply to other touch sensitive devices. In those contexts, the machine of FIG. 5 may be a server computer, a client computer, a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processors 502 (e.g., a central processing unit (CPU), one or more graphics processing units (GPU), one or more digital signal processors (DSP), one or more application specific integrated circuits (ASICs), one or more radio-frequency integrated circuits (RFICs), or any combination of these), a main memory 504, and a static memory 506, which are configured to communicate with each other via a bus 508. The computer system 500 may further include visual display interface 510. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 510 may include or may interface with a touch enabled screen. The computer system 500 may also include alphanumeric input device 512 (e.g., a keyboard or touch screen keyboard), a cursor control device 514 (e.g., a mouse, a trackball, a joystick, a motion sensor, or other pointing instrument), a storage unit 516, a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 (e.g., software) may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 (e.g., software) may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but not be limited to, data repositories in the form of solid-state memories, optical media, and magnetic media.

The computer system 500 also may include the one or more sensors 525. Also note that a computing device may include only a subset of the components illustrated and described with FIG. 5. For example, an IoT device may only include a processor 502, a small storage unit 516, a main memory 504, a visual interface 510, a network interface device 520, and a sensor 525.

V. Additional Considerations

It is to be understood that the figures and descriptions of the present disclosure have been simplified to illustrate elements that are relevant for a clear understanding of the present disclosure, while eliminating, for the purpose of clarity, many other elements found in a typical system. Those of ordinary skill in the art may recognize that other elements and/or steps are desirable and/or required in implementing the present disclosure. However, because such elements and steps are well known in the art, and because they do not facilitate a better understanding of the present disclosure, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

While particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer-readable medium comprising stored computer-readable instructions, the instructions comprising instructions to regulate power to electronic components of a tablet device that, when executed by a processor, cause the processor to:
    record an amount of time that the tablet device has spent in an idle state;
    transition the tablet device into a regularized suspend state in response to the tablet device spending an above threshold amount of time in the idle state, the transition deactivating a first subset of electronic components of the tablet device and maintaining power to a second subset of electronic components for detecting contact at a contact-sensitive surface of the tablet device; and
    present, by a display of the tablet device, a persistent display while the tablet device is in the regularized suspend state, the persistent display displaying a graphic associated with a most recent set of user inputs to the tablet device.

2. The non-transitory computer-readable medium of claim 1, comprising further stored instructions that when executed cause the processor to:
    present, by the display of the tablet device, an active display while the tablet device is in the idle state, wherein the active display dynamically changes without user inputs at the contact-sensitive surface of the tablet device.

3. The non-transitory computer-readable medium of claim 1, comprising further stored instructions that when executed cause the processor to:
    determine that a user is no longer interacting with the contact-sensitive surface of the tablet device based on the amount of time that the tablet device has spent in the idle state; and
    transition the first subset of electronic components of the tablet device into the regularized suspend state based on the determination.

4. The non-transitory computer-readable medium of claim 1, further comprising stored instructions that cause the processor to:
    detect an activation trigger condition; and
    increase power consumption by the first subset of electronic components to detect user inputs at the contact-sensitive surface of the tablet device in response to the activation trigger condition.

5. The non-transitory computer-readable medium of claim 1, wherein the stored instructions to transition the first subset of electronic components of the tablet device into a regularized suspend state comprises further stored instructions that when executed causes the processor to:
    deactivate a processor of the tablet device;
    transition memory of the tablet device into an active retention mode; and maintain power consumption by the second subset of electronic components that enable contact-sensing capabilities of the tablet device.

6. A tablet device comprising:
an input mechanism;
a contact-sensitive surface; and
a non-transitory computer-readable medium comprising stored computer-readable instructions for regulating power to electronic components of a tablet device that, when executed by a processor, cause the processor to:
record an amount of time that the tablet device has spent in an idle state;
transition the tablet device into a regularized suspend state in response to the tablet device spending an above threshold amount of time in the idle state, the transition deactivating a first subset of electronic components of the tablet device and maintaining power to a second subset of electronic components for detecting contact at a contact-sensitive surface of the tablet device; and
present, by a display of the tablet device, a persistent display while the tablet device is in the regularized suspend state, the persistent display displaying a graphic associated with a most recent set of user inputs to the tablet device.

7. The tablet device of claim 6, comprising further stored instructions that when executed cause the processor to:
present, by the display of the tablet device, an active display while the tablet device is in the idle state, wherein the active display dynamically changes without user inputs at the contact-sensitive surface of the tablet device.

8. The tablet device of claim 6, comprising further stored instructions that when executed cause the processor to:
determine that a user is no longer interacting with the contact-sensitive surface of the tablet device based on the amount of time that the tablet device has spent in the idle state; and
transition the first subset of electronic components of the tablet device into the regularized suspend state based on the determination.

9. The tablet device of claim 6, further comprising stored instructions that cause the processor to:
detect an activation trigger condition; and
increase power consumption by the first subset of electronic components to detect user inputs at the contact-sensitive surface of the tablet device in response to the activation trigger condition.

10. The tablet device of claim 6, wherein the stored instructions to transition the first subset of electronic components of the tablet device into a regularized suspend state comprises further stored instructions that when executed causes the processor to:
deactivate a processor of the tablet device;
transition memory of the tablet device into an active retention mode; and
maintain power consumption by the second subset of electronic components that enable contact-sensing capabilities of the tablet device.

11. A system comprising:
a device status monitor configured to record an amount of time that a tablet device has spent in an idle state;
a component power controller configured to transition the tablet device into a regularized suspend state in response to the tablet device spending an above threshold amount of time in the idle state, the transition deactivating a first subset of electronic components of the tablet device and maintaining power to a second subset of electronic components for detecting contact at a contact-sensitive surface of the tablet device; and
a graphics generator configured to present, by a display of the tablet device, a persistent display while the tablet device is in the regularized suspend state, the persistent display displaying a graphic associated with a most recent set of user inputs to the tablet device.

12. The system of claim 11, wherein:
the graphics generator displays an active display while the tablet device is in the idle state, wherein the active display dynamically changes without user inputs at the contact-sensitive surface of the tablet device.

13. The system of claim 11, wherein:
the device status monitor is further configured to determine that a user is no longer interacting with the contact-sensitive surface of the tablet device based on the amount of time that the tablet device has spent in the idle state; and
the component power controller is further configured to transition the first subset of electronic components of the tablet device into the regularized suspend state based on the determination.

14. The system of claim 11, wherein:
the device status monitor is further configured to detect an activation trigger condition; and
the component power controller is further configured to increase power consumption by the first subset of electronic components to detect user inputs at the contact-sensitive surface of the tablet device in response to the activation trigger condition.

15. The system of claim 11, wherein:
the component power controller is further configured to:
deactivate a processor of the tablet device;
transition memory of the tablet device into an active retention mode; and
maintain power consumption by the second subset of electronic components that enable contact-sensing capabilities of the tablet device.

* * * * *